United States Patent
Ueda et al.

(10) Patent No.: US 8,786,245 B2
(45) Date of Patent: Jul. 22, 2014

(54) MOTOR CONTROL DEVICE

(75) Inventors: Koichiro Ueda, Tokyo (JP); Hidetoshi Ikeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 105 days.

(21) Appl. No.: 13/639,631

(22) PCT Filed: May 10, 2011

(86) PCT No.: PCT/JP2011/060738
§ 371 (c)(1),
(2), (4) Date: Oct. 5, 2012

(87) PCT Pub. No.: WO2011/145475
PCT Pub. Date: Nov. 24, 2011

(65) Prior Publication Data
US 2013/0033221 A1 Feb. 7, 2013

(30) Foreign Application Priority Data
May 18, 2010 (JP) ................................ 2010-114204

(51) Int. Cl.
*H02P 7/18* (2006.01)
*H02P 29/00* (2006.01)

(52) U.S. Cl.
USPC ........... 318/689; 318/607; 318/609; 318/632; 264/40.3; 264/40.5; 72/453.13

(58) Field of Classification Search
USPC ................. 318/689, 607, 609, 610, 632, 645; 264/40.1, 40.3, 40.5; 72/453.13
See application file for complete search history.

(56) References Cited

U.S. PATENT DOCUMENTS

| 4,828,473 | A * | 5/1989 | Otake et al. ................... 425/145 |
| 6,936,990 | B2 * | 8/2005 | Oyama et al. ................. 318/632 |
| 6,994,537 | B2 * | 2/2006 | Liu et al. ....................... 425/143 |
| 7,331,208 | B2 * | 2/2008 | Fujibayashi et al. ............ 72/454 |
| 7,344,664 | B2 * | 3/2008 | Kamiguchi et al. ......... 264/40.5 |

(Continued)

FOREIGN PATENT DOCUMENTS

| JP | 10 202327 | 8/1998 |
| JP | 2004 272883 | 9/2004 |
| JP | 2007 111704 | 5/2007 |

OTHER PUBLICATIONS

International Search Report Issued Aug. 16, 2011 in PCT/JP11/60738 Filed May 10, 2011.

(Continued)

*Primary Examiner* — Paul Ip
(74) *Attorney, Agent, or Firm* — Oblon, Spivak, McClelland, Maier & Neustadt, L.L.P.

(57) ABSTRACT

A motor control device main unit includes a pressure command signal generation module, a simulated pressure control module, a simulated position calculation module, a simulated pressure signal generation module, a pressure control module, a speed control module, and a current control module. The speed control module receives a motor speed command signal, which is a signal of a sum of an actual motor speed command value of an actual motor speed command signal from the pressure control module and a simulated speed calculated value of a simulated motor speed signal. The speed control module carries out speed control calculation based on a motor speed command value of the motor speed command signal and an actual motor speed of an actual motor speed signal.

9 Claims, 7 Drawing Sheets

(56) References Cited

U.S. PATENT DOCUMENTS

| | | | |
|---|---|---|---|
| 7,462,025 B2* | 12/2008 | Uchiyama et al. | 425/143 |
| 7,739,894 B2* | 6/2010 | Suzuki | 72/454 |
| 7,824,164 B2* | 11/2010 | Hakoda et al. | 425/145 |
| 7,845,205 B2* | 12/2010 | Iwashita et al. | 72/454 |
| 7,904,196 B2* | 3/2011 | Okazaki | 700/203 |
| 8,037,735 B2* | 10/2011 | Kohno et al. | 72/453.13 |
| 8,042,375 B2* | 10/2011 | Suzuki | 72/453.13 |
| 8,089,226 B2* | 1/2012 | Matsutani et al. | 318/68 |
| 8,119,044 B1* | 2/2012 | Akasaka | 264/40.7 |
| 8,229,592 B2* | 7/2012 | Akasaka | 700/200 |
| 2003/0062643 A1* | 4/2003 | Bulgrin et al. | 264/40.1 |
| 2003/0184251 A1* | 10/2003 | Oyama et al. | 318/607 |
| 2004/0119183 A1* | 6/2004 | Liu et al. | 264/40.5 |
| 2004/0183494 A1 | 9/2004 | Nagaoka et al. | |
| 2005/0206025 A1* | 9/2005 | Kamiguchi et al. | 264/40.5 |
| 2006/0012326 A1* | 1/2006 | Iwashita et al. | 318/645 |
| 2006/0145379 A1* | 7/2006 | Okazaki | 264/40.1 |
| 2006/0276927 A1* | 12/2006 | Uchiyama et al. | 700/203 |
| 2007/0084264 A1* | 4/2007 | Iwashita et al. | 72/350 |
| 2009/0078016 A1* | 3/2009 | Suzuki | 72/20.1 |
| 2009/0087510 A1* | 4/2009 | Hakoda et al. | 425/149 |
| 2009/0126453 A1* | 5/2009 | Suzuki | 72/453.13 |
| 2011/0298146 A1* | 12/2011 | Akasaka | 264/40.3 |
| 2012/0104642 A1* | 5/2012 | Akasaka | 264/40.3 |
| 2013/0147078 A1* | 6/2013 | Matsubayashi et al. | 264/40.3 |

OTHER PUBLICATIONS

U.S. Appl. No. 13/639,281, filed Oct. 4, 2012, Ueda.
U.S. Appl. No. 13/699,343, filed Nov. 21, 2012, Ueda, et al.

\* cited by examiner (a)

(b)

MOTOR CONTROL DEVICE

TECHNICAL FIELD

The present invention relates to a motor control device for controlling drive of a motor for pressing a mechanical load against a target.

BACKGROUND ART

In various molding/forming machines such as an injection molding machine and a press-forming machine, and a machining device (machining machines) such as a bonding machine, an electrically-powered mechanism (mechanical driving unit) is driven by a motor, thereby applying a pressure on a pressurized target. Moreover, in those machining devices, generally, an actual pressure value, which is pressure information when the mechanical load is pressed against a material to be molded/formed or the like or a workpiece, which is the pressurized target, is detected, and pressure control is performed based on the detected actual pressure value and a pressure command value. Based on this pressure control, a current command value, a speed command value, and the like, which are signals for controlling the motor, are calculated so that the actual pressure value follows the pressure command value.

One example of the calculation for the pressure control is calculation of a speed of a motor based on a speed command value calculated by multiplying a deviation (difference) between a pressure command value and the actual pressure value by a proportional gain. In general, by setting the gain characteristic of the calculation for the pressure control to a relatively large value, a capability of the actual pressure value to follow the pressure command value can be improved. On the other hand, when the proportional gain is set to an excessively large value, stability of a control system is compromised, the control system becomes unstable, and an oscillation phenomenon in which a high frequency vibration is superimposed on a pressure applied to a pressurized target occurs.

Needless to say, it is not preferred that the control system become unstable, and an adverse effect is generated on formed/molded products and machined products by the generated oscillation phenomenon. On the other hand, the oscillation phenomenon is prevented by setting the gain characteristic to a relatively small value but a characteristic of an actual pressure value to follow a pressure command value decreases. This leads to an error of the actual pressure value, which is a pressure actually applied, with respect to the pressure command value, which is a desired pressure, resulting in a problem in that an adverse effect is generated on forming/molding precisions of the formed/molded products and a machining precision of the machined products.

In order to address this problem, for example, in a conventional device described in Patent Literature 1, a die cushion control device produces a correction value, which is a product of a derivative of a pressure command value and a coefficient, and adds the correction value to a speed command value, thereby improving the capability of an actual pressure value to follow the pressure command value.

CITATION LIST

Patent Literature

[PTL 1]: JP 2007-111704 A

SUMMARY OF INVENTION

Technical Problem

However, according to the conventional device described in Patent Literature 1, if a pressurized target presents a nonlinear characteristic with respect to a mechanical physical quantity applied by a mechanical load, a correction value is no longer accurate. Therefore, there poses a problem in that an overshoot is generated, or in that a sufficient command following characteristic is not provided.

It should be noted that this problem occurs in force control in addition to in the pressure control.

The present invention has been made in order to solve the above-mentioned problem, and therefore has an object to provide a motor control device capable of improving, even if a pressurized target presents a nonlinear characteristic with respect to a mechanical physical quantity applied from a mechanical load, a capability of the mechanical physical quantity applied to the target to follow a physical command value.

Solution to Problem

According to the present invention, there is provided a motor control device provided to an electrically-powered mechanism which includes a motor, is connected to a mechanical load for applying a mechanical physical quantity, which is any one of a force and a pressure, to a target, and applies the mechanical physical quantity to the target, by power of the motor, by displacing the mechanical load to press the mechanical load against the target, the motor control device including a motor control device main unit for acquiring, as a physical quantity acquired value, a value of the mechanical physical quantity acting from the mechanical load to the target, generating a physical quantity command value used to control the physical quantity acquired value to attain a physical quantity target value set in advance, and controlling drive of the motor by using the generated physical quantity command value, in which: the motor control device main unit includes: a simulated physical quantity control module for calculating a simulated speed calculated value regarding a motor speed by carrying out a predetermined simulated physical quantity control calculation from a difference between the physical quantity command value and a simulated physical quantity calculated value; a simulated position calculation module for calculating a simulated position calculated value regarding any one of a motor position and a position of the mechanical load by carrying out calculation on the simulated speed calculated value by using a transfer characteristic including a first-order integral characteristic; a simulated physical quantity calculation module for calculating the simulated physical quantity calculated value, which is a value simulating the mechanical physical quantity acting from the mechanical load to the target, by storing, in advance, information on the mechanical physical quantity and information on any one of the motor position and the position of the mechanical load in association with each other as information for simulation calculation, and by carrying out calculation on the simulated position calculated value by using the information for simulation calculation; and a physical quantity control module for calculating an actual speed command value regarding the motor speed by carrying out pressure control calculation based on the physical quantity acquired value and the simulated physical quantity calculated value; and the motor control device main unit controls the motor speed based on a sum of the simulated speed calculated value and the actual speed command value.

Advantageous Effects of Invention

According to the motor control device of the present invention, the motor control device main unit includes the simulated physical quantity control module, the simulated position calculation module, the simulated physical quantity calculation module, and the physical quantity control module, and controls the motor speed based on the sum of the simulated speed calculated value and the actual speed command value. Therefore, even if a pressurized target presents a nonlinear characteristic with respect to the mechanical physical quantity applied by the mechanical load, the capability of the mechanical physical quantity applied to the target to follow the physical quantity command value can be improved.

DESCRIPTION OF EMBODIMENTS

Figure 1:
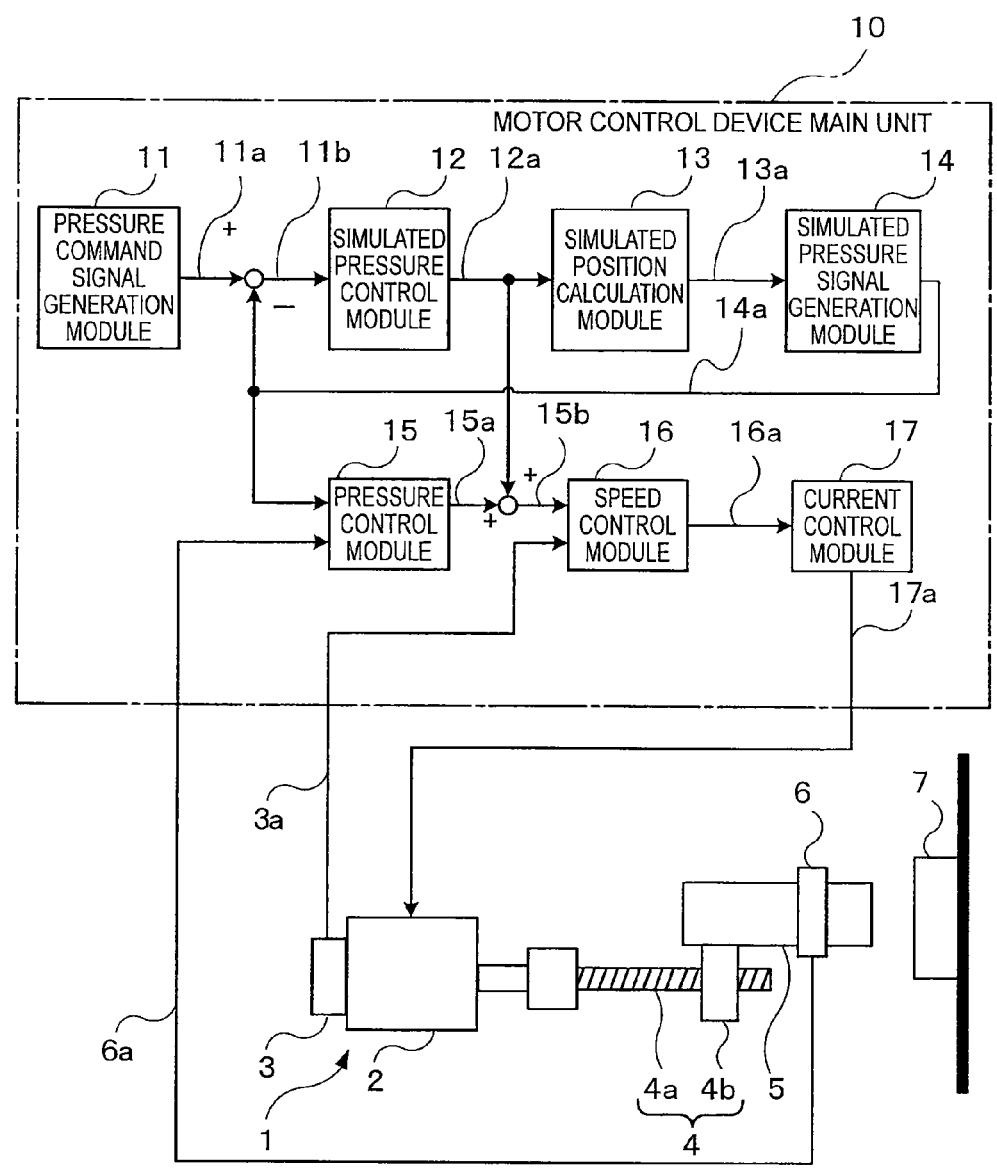
FIG. 1 A block diagram illustrating a motor control device according to a first embodiment of the present invention.

A description is now given of embodiments of the present invention referring to the drawings.

First Embodiment

FIG. 1 is a block diagram illustrating a motor control device according to a first embodiment of the present invention.

In FIG. 1, a machining device 1 includes an electrically-powered mechanism 4 including a rotational motor (motor for pressing) 2 and an encoder 3, a mechanical load 5 as the mechanical load, and a pressure detector 6.

The encoder 3 is speed detection means for generating an actual motor speed signal 3a corresponding to a rotation speed of the motor 2. The electrically-powered mechanism 4 is a feed screw mechanism which converts a rotational motion to a translational motion, and includes a screw 4a and a ball screw nut 4b. The screw 4a is rotated in its peripheral direction by the motor 2. The ball screw nut 4b is displaced in an axial direction of the screw 4a by the rotation of the screw 4a.

The mechanical load 5 is attached to the ball screw nut 4b. A distal end portion of the mechanical load 5 is opposed to a pressurized target (target) 7. Moreover, the mechanical load 5 is displaced in the axial direction of the screw 4a along with the ball screw nut 4b. The pressurized target 7 is pressurized by the mechanical load 5. The pressure detector 6 is a load cell, a type of force sensor, or the like. Moreover, the pressure detector 6 is attached to the mechanical load 5. Further, the pressure detector 6 outputs an actual pressure signal 6a corresponding to an actual pressure value while the mechanical load 5 is pressurizing the pressurized target 7.

The drive of the motor 2 of the machining device 1 is controlled by the motor control device main unit 10. The motor control device main unit 10 includes a pressure command signal generation module 11, a simulated pressure control module 12, a simulated position calculation module 13, a simulated pressure signal generation module 14, a pressure control module 15, a speed control module 16, and a current control module 17. The pressure command signal generation module 11 generates a signal of a pressure command value (physical quantity command value) to control an actual pressure value (physical quantity acquired value) of an actual pressure signal 6a to be a desired target pressure value, namely generates a pressure command signal 11a.

The simulated pressure control module (simulated physical quantity control module) 12 receives a signal 11b representing a deviation (difference) between the pressure command value of the pressure command signal 11a from the pressure command signal generation unit 11, and a simulated pressure calculated value (simulated physical quantity calculated value) of a simulated pressure signal 14a generated by the simulated pressure signal generation module 14. Moreover, the simulated pressure control module 12 calculates a simulated speed calculated value by carrying out simulated pressure control calculation (simulated physical quantity control calculation) based on the deviation between the pressure command value and the simulated pressure calculated value, and generates a simulated motor speed signal 12a, which is a signal of the simulated speed calculated value. This simulated speed calculated value is a simulated motor speed of the motor 2.

One example of this simulated pressure control calculation is calculating the simulated speed calculated value by means of proportional control by multiplying the deviation between the pressure command value and the simulated pressure calculated value by a proportional gain. The example is not limited to this case, and, for example, proportional and integral control for carrying out proportional control and integral control for the deviation between the pressure command value and the simulated pressure calculated value may be used. Moreover, with the simulated pressure control calculation, a filter having a low-pass characteristic, a phase-lag filter, a phase-lead filter, or the like may be combined.

The simulated position calculation module 13 receives the simulated motor speed signal 12a from the simulated pressure control module 12. Moreover, the simulated position calculation module 13 carries out transfer characteristic calculation for the simulated speed calculated value, thereby calculating a simulated position calculated value regarding the motor position, and generates a simulated position signal 13a, which is a signal of the simulated position calculated value. A transfer characteristic of the simulated position calculation module 13 from the simulated speed calculated value to the simulated position calculated value contains a first-order integral characteristic. In this way, if the transfer characteristic contains a first-order integral characteristic, a relation between the motor speed and the motor position can be simulated.

One example of the calculation by the simulated position calculation module 13 is calculation represented by the following equation (1):

$$xm(s) = (1/s) \cdot vm(s) \tag{1}$$

where s represents a Laplacian operator, vm(s) represents a Laplacian transform of the simulated speed calculated value, and xm(s) represents a Laplacian transform of the simulated position calculated value.

It should be noted that this equation (1) represents that the transfer characteristic from the simulated speed calculated value to the simulated position calculated value contains the first-order integral characteristic.

Moreover, besides this equation (1), the transfer characteristic may further contain a low-pass characteristic in addition to the first-order integral characteristic. For example, calculation represented by the following equation (2) may be carried out to calculate the simulated position calculated value:

$$xm(s)=(1/s)\cdot\{1/(Ts+1)\}\cdot vm(s) \qquad (2)$$

where T is a time constant of a low-pass-characteristic filter.

The simulated pressure signal generation module 14 receives the simulated position signal 13a from the simulated position calculation module 13. Moreover, the simulated pressure signal generation module 14 stores values of the motor position of the motor 2 and values of the pressure acting on the pressurized target 7 in association with each other on a one-to-one basis. Further, the simulated pressure signal generation module 14 takes the simulated position calculated value of the simulated position signal 13a as the motor position, and calculates a pressure corresponding to the motor position as a simulated pressure calculated value. Moreover, the simulated pressure signal generation module 14 generates a simulated pressure signal 14a, which is a signal of the calculated simulated pressure calculated value.

Figure 2:
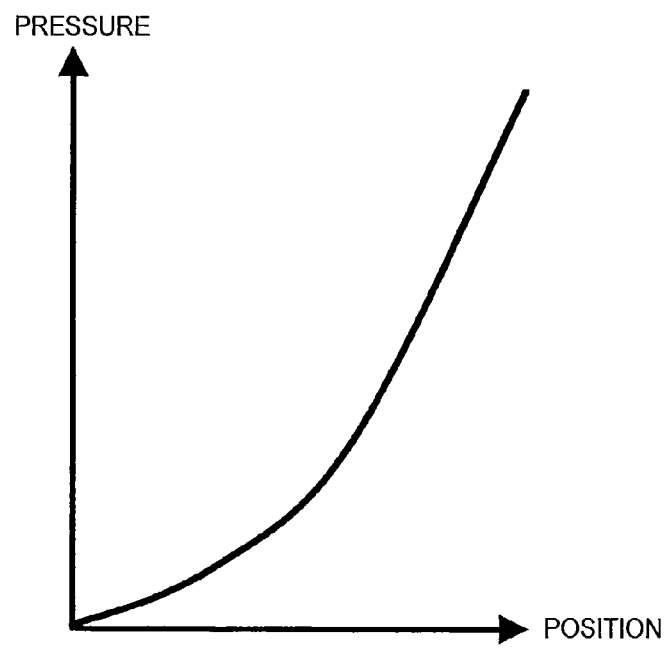
FIG. 2 A graph representing a relation between a pressure and a position.

On this occasion, the pressure is not generated until the mechanical load 5 comes in contact with the pressurized target 7. Moreover, the pressure is generated when the mechanical load comes in contact with the pressurized target 7 and even if the mechanical load 5 is in a stationary state, the pressure is generated as long as the mechanical load 5 is in contact with the pressurized target 7. Moreover, as the position of the mechanical load 5 moves toward the pressurized target 7 further, a larger pressure is generated. In other words, the pressure is determined only depending on the position of the mechanical load 5. It should be noted that the relation between the position and the pressure is not linear, and, depending on the type of the pressurized target 7, there may be a nonlinear characteristic. It should be noted that FIG. 2 is a graph representing an example of the relation between the position and the pressure when the characteristic of the pressurized target 7 is nonlinear.

In this way, the simulated pressure signal generation module 14 stores changes in motor position and changes in pressure in association with each other on a one-to-one basis, and hence even if the pressurized target 7 exhibits a nonlinear characteristic in response to the pressure applied by the mechanical load 5, the simulated pressure calculated value can be calculated.

One example of a method of realizing the simulated pressure signal generation module 14 is a configuration in which a table (information for simulation calculation) in which motor positions and pressures are associated with each other is stored in advance, and in which, by referring to the table, when the simulated position signal 13a is received, a pressure corresponding to the simulated position calculated value of the simulated position signal 13a is calculated as the simulated pressure calculated value. Moreover, the method of realizing the simulated pressure signal generation module 14 is not limited to a table. An approximation function (information for simulation calculation) for simulating the relation between the motor position and the pressure may be stored in advance, and the simulated pressure calculated value may be calculated by using this approximation function.

The pressure control module (physical quantity control module) 15 receives the simulated pressure signal 14a from the simulated pressure signal generation module 14 and receives the actual pressure signal 6a from the pressure detector 6. Moreover, the pressure control module 15 carries out pressure control calculation, thereby calculating the actual motor speed command value so that the pressure command value and the actual pressure value coincide with each other, and generates the actual motor speed command signal 15a, which is a signal of the actual motor speed command value (actual speed command value). One example of the pressure control calculation by the pressure control module 15 is proportional control, which multiplies the deviation between the pressure command value and the actual pressure value by a proportional constant defined by a proportional gain parameter, thereby calculating the actual speed command value.

The speed control module 16 receives a motor speed command signal 15b, which is a signal of a sum of the actual motor speed command value of the actual motor speed command signal 15a from the pressure control module 15 and the simulated speed calculated value of the simulated motor speed signal 12a. Moreover, the speed control module 16 receives an actual motor speed signal 3a from the encoder 3. Further, the speed control module 16 carries out speed control calculation based on the motor speed command value of the motor speed command signal 15b and the actual motor speed of the actual motor speed signal 3a.

Moreover, the speed control module 16 carries out the speed control calculation, thereby calculating a motor current command value based on a deviation between the motor speed command value and the actual motor speed, and generates a motor current command signal 16a, which is a signal of the motor current command value. One example of the speed control calculation by the speed control module 16 is proportional and integral control based on two parameters, which are a proportional gain parameter and an integral gain parameter.

The current control module 17 receives the motor current command signal 16a from the speed control module 16. Moreover, the current control module 17 feeds a current to the motor 2, based on the motor current command value of the motor current command signal 16a.

On this occasion, the motor control device main unit 10 can be constituted by a calculation processing unit (CPU), a storage unit (ROM, RAM, and the like), a computer (not shown) including a signal input/output unit, and an inverter or the like (not shown) for supplying the motor with the current. The storage unit of the computer of the motor control device main unit 10 stores programs for realizing the functions of the pressure command signal generation module 11, the simulated pressure control module 12, the simulated position calculation module 13, the simulated pressure signal generation module 14, the pressure control module 15, the speed control module 16, and the current control module 17.

A description is now given of effects provided by the configuration of the first embodiment. According to the configuration of the conventional pressure control system, without increasing the gain characteristic of the pressure control module, it is difficult to increase the performance of the actual pressure value to follow the pressure command value. However, there are lag elements in the current control module, and in the respective detection modules including the pressure detection module, the actual position detection module, and the speed signal detection module. As a result, when the gain of the pressure control module is set to an excessively large value, the setting exerts influence on the stability of the control system, a control loop becomes unstable, and the decrease in stability of the control system causes unfavorable phenomena such as an occurrence of vibration on the detected pressure signal.

In contrast, in the motor control device according to the first embodiment, a simulation calculation system, which is a virtual loop constituted by the simulated pressure control module 12, the simulated position calculation module 13, and the simulated pressure signal generation module 14, is constituted on the computer of the motor control device main unit 10. The simulated pressure signal 14*a*, the simulated motor speed signal 12*a*, and the simulated position signal 13*a*, which are generated by this simulation calculation system, are generated by the computer, and are determined independently of the current control module and the respective detection modules including the pressure detection module, the actual position detection module, and the speed signal detection module which contain the lag elements.

Thus, even if the gain characteristic of the simulated pressure control module 12 is set to a large value, the setting does not influence the stability of the control system. Based on this fact, when the gain characteristic of the simulated pressure control module 12 is set to a relatively large value, a capability of the simulated pressure calculated value of the simulated pressure signal 14*a* to follow the pressure command value of the pressure command signal 11*a* can be improved.

Moreover, the simulated speed calculated value of the simulated motor speed signal 12*a* generated along with the simulated pressure signal 14*a* by the simulation calculation system serves as a motor speed for the simulated pressure calculated value of the simulated pressure signal 14*a* to follow, in a highly responsive manner, the pressure command value of the pressure command signal 11*a*. By adding the simulated motor speed signal 12*a*, in a feed forward manner, to the actual motor speed command signal 15*a*, which is the output of the pressure control module 15, the motor speed command signal 15*b*, which is actually provided for the motor, serves as a motor speed command signal, which can realize improvement of a followability of the pressure.

Further, the simulated pressure signal generation module 14 accurately simulates the characteristic of the pressurized target 7, and hence the respective values of the simulated pressure signal 14*a* and the actual pressure signal 6*a* are approximately equal to each other. As a result, errors in the respective values of the simulated pressure signal 14*a* and the actual pressure signal 6*a* are approximately 0, and hence the actual motor speed command value of the actual motor speed command signal 15*a*, which is the output of the pressure control module 15, becomes approximately 0. As a result, out of the motor speed command signal 15*b*, the simulated speed calculated value of the simulated motor speed signal 12*a* is a major component of the motor speed command signal 15*b*, and serves as a motor speed command value based on which the motor 2 should operate. It should be noted that when an error of the simulated pressure calculated value of the simulated pressure signal 14*a* with respect to the actual pressure value of the actual pressure signal 6*a* occurs, the actual motor speed command signal 15*a* serves as a signal for correcting the error.

The simulated motor speed signal 12*a* is a signal determined independently of the current control module 17 containing the lag element, the actual motor speed signal 3*a*, and the actual pressure signal 6*a* even if the gain characteristic of the simulated pressure control module 12 is increased. Therefore, without influencing the stability of the control system, the motor speed command value, based on which the motor 2 should operate in order to quickly follow the pressure command value of the pressure command signal 11*a*, can be generated.

Moreover, even if the pressurized target 7 exhibits a non-linear characteristic with respect to the pressure applied from the mechanical load 5, the simulated pressure signal generation module 14 calculates the simulated pressure calculated value of the simulated pressure signal 14*a* from the simulated position calculated value of the simulated position signal 13*a* by using a table or an approximation function. According to this configuration, it is possible to more accurately calculate the simulated speed calculated value of the simulated motor speed signal 12*a* serving as the motor speed command signal which can improve the command following characteristic of the value of the actual pressure signal 6*a*.

Second Embodiment

In the first embodiment, as an example of the simulated pressure control module 12, a description has been given of the example in which, for the signal of the deviation between the pressure command value and the simulated pressure calculated value, the simulated speed calculated value is calculated by carrying out linear control calculation such as a proportional control or a proportional and integral control. In contrast, in the second embodiment, a description is given of an example in which restriction processing is added to the calculation relating to the linear transfer characteristic such as the proportional control.

Figure 3:
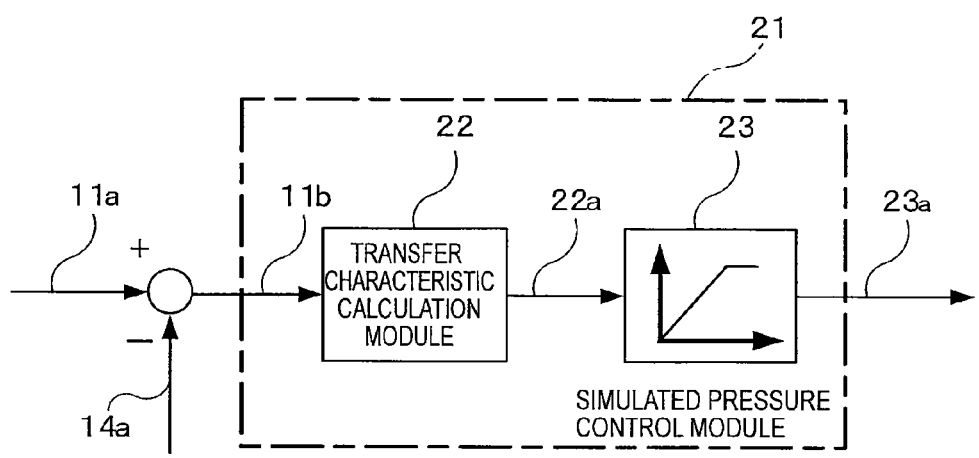
FIG. 3 A block diagram illustrating a motor control device according to a second embodiment of the present invention.

FIG. 3 is a block diagram illustrating a part of the motor control device according to the second embodiment of the present invention. In FIG. 3, the schematic configuration of the motor control device according to the second embodiment is the same as the configuration of the first embodiment, and in the second embodiment, in place of the simulated pressure control module 12 according to the first embodiment, a simulated pressure control module 21 is used.

The simulated pressure control module 21 according to the second embodiment includes a transfer characteristic calculation module 22 and a restriction processing module 23. The transfer characteristic calculation module 22 carries out linear control calculation such as the proportional control or the proportional and integral control based on a deviation (difference) between the pressure command value of the pressure command signal 11*a* and the simulated pressure calculated value of the simulated pressure signal 14*a*, as in the case of the simulated pressure control module 12 according to the first embodiment. As a result, the transfer characteristic calculation module 22 calculates the simulated speed calculated value, and transmits a signal thereof (transfer characteristic output signal) 22*a* to the restriction processing module 23.

When the simulated speed calculated value of the signal 22*a* from the transfer characteristic calculation module 22 is equal to or less than a predetermined value, the restriction processing module 23 sets the signal 22*a* directly to the simulated motor speed signal 23*a*. On the other hand, when the simulated speed calculated value of the signal 22*a* from the transfer characteristic calculation module 22 is more than the predetermined value, the restriction processing module 23 sets the predetermined value as the simulated speed calculated value, and sets a signal of the predetermined value as the simulated motor speed signal 23*a*.

On this occasion, by setting the predetermined value of the restriction processing module 23 to be equal to or less than the maximum speed of the motor 2, the simulated speed calculated value is prevented from taking a value more than the maximum speed of the motor 2. As a result, the control can be carried out in a state in which the motor speed command value of the motor speed command signal 15b does not exceed the maximum speed of the motor 2 either.

Figure 4:
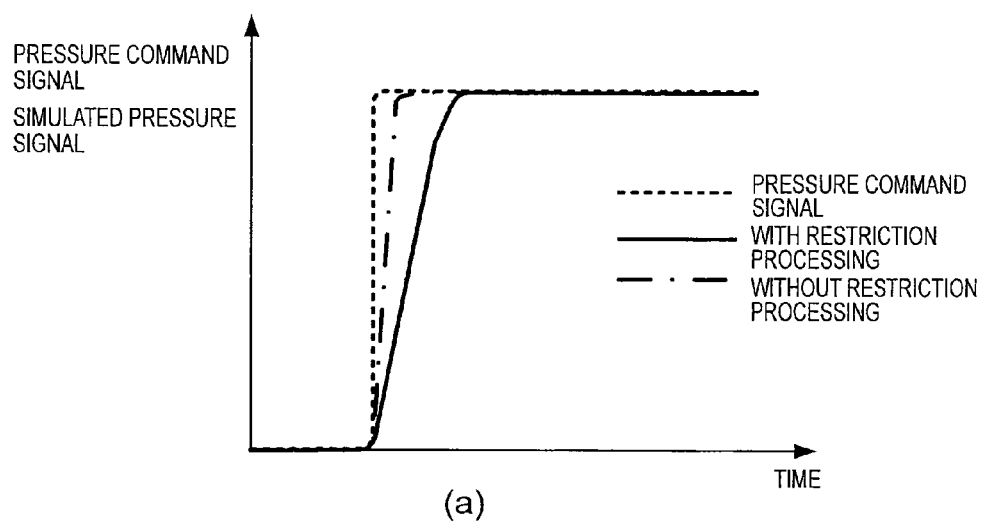
FIGS. 4 Graphs describing changes of signals.
Figure 4:
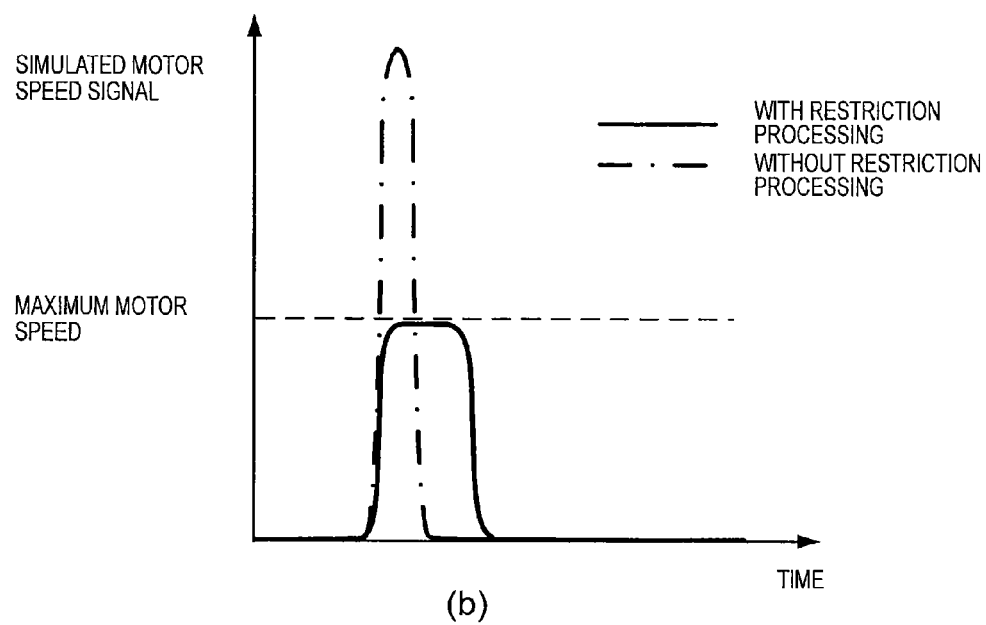

A description is now given of effects of the second embodiment. FIG. 4 include graphs describing the effect of the second embodiment. FIG. 4(a) illustrates a change in the simulated pressure signal 14a with respect to time and a change in the pressure command signal 11a with respect to time, and FIG. 4(b) illustrates a change in the simulated motor speed signal 23a with respect to time. Moreover, in FIGS. 4, changes in the simulated pressure signal 14a and the simulated motor speed signal 23a when the restriction processing module 23 is used are represented by solid lines, changes in the simulated pressure signal 14a and the simulated motor speed signal 23a when the restriction processing module 23 is not used are represented by long dashed short dashed lines, and a change in the pressure command signal 11 a is represented by a broken line. A case where the maximum motor speed is set as the predetermined value of the restriction processing module 23 when the restriction processing module 23 is used is illustrated in FIGS. 4.

With the added processing of the restriction processing module 23, compared with the case where the restriction processing module 23 is not used, the capability of the simulated pressure calculated value of the simulated pressure signal 14a to follow the pressure command value of the pressure command signal 11 a becomes slightly slower. On the other hand, when the restriction processing module 23 is not used, it is not guaranteed that the simulated speed calculated value of the simulated motor speed signal 23a is equal to or less than the maximum motor speed, and the simulated speed calculated value may exceed the maximum motor speed. In contrast, when the restriction processing module 23 is used, the simulated speed calculated value of the simulated motor speed signal 23a does not exceed the maximum motor speed.

On this occasion, when the restriction processing module 23 is used, from another point of view, the pressure command signal 11a is shaped to the simulated pressure signal 14a based on the maximum speed of the motor 2 in order to improve the capability to follow as much as possible, and, in order to further realize the motion of the simulated pressure signal 14a, the simulated speed calculated value (simulated motor speed signal 23a) is calculated. On this occasion, the simulated motor speed signal 23a having the simulated speed calculated value equal to or less than the maximum motor speed is applied, in a feed-forward manner, to the speed control module 16.

Therefore, the speed control module 16 tends to control the motor speed to be equal to or less than the maximum motor speed so as to follow the simulated speed calculated value of the simulated motor speed signal 23a. Moreover, the simulated motor speed signal 23a is a signal for realizing the simulated pressure signal 14a, and the simulated pressure signal generation module 14 has simulated the characteristic of the pressurized target 7. Accordingly, the pressure applied to the pressurized target 7 is approximately the same as the simulated pressure calculated value of the simulated pressure signal 14a.

On this occasion, the difference between the simulated pressure calculated value of the simulated pressure signal 14a and the actual pressure value of the actual pressure signal 6a is maintained to be close to 0, and the actual motor speed command signal value of the actual motor speed command signal 15a takes a value close to 0 as well. As a result, the motor speed command value of the motor speed command signal 15b, which is a sum of the simulated speed calculated value of the simulated motor speed signal 23a and the actual motor speed command value of the actual motor speed command signal 15a, does not exceed the maximum motor speed either.

By the way, for restricting the motor speed command value of the motor speed command signal 15b to a value equal to or less than the maximum speed of the motor 2, it is also possible to directly perform the restriction processing on the motor speed command value of the motor speed command signal 15b for the motor 2, without providing the simulated pressure control module 12 of FIG. 1 with the restriction processing module 23 as illustrated in FIG. 3. Even in this case, the motor speed command value of the motor speed command signal 15b, which is the reference signal for the speed control, is equal to or less than the maximum speed of the motor 2.

In this case, the restriction processing module 23 is not provided for the simulated pressure control module 12, and hence as illustrated in FIGS. 4, the capability of the simulated pressure calculated value of the simulated pressure signal 14a to follow the pressure command value of the pressure command signal 11 a is improved. However, in this case, the restriction processing is placed on the motor speed command signal 15b, and the motor 2 thus does not operate at a speed equal to or higher than the maximum motor speed. Therefore, the actual pressure value dependent on the motor speed does not exhibit so much improvement in capability to follow the pressure command value of the pressure command signal 11 a as the simulated pressure calculated value of the simulated pressure signal 14a.

On this occasion, the actual pressure value of the actual pressure signal 6a presents a large deviation from the simulated pressure calculated value of the simulated pressure signal 14a, and as a result, the actual motor speed command value of the actual motor speed command signal 15a generated by the pressure control module 15 starts to take a relatively large value, resulting in an increase in ratio of the actual motor speed command signal 15a to the motor speed command signal 15b.

In this way, when the ratio of the actual motor speed command signal 15a to the motor speed command signal 15b increases, it is necessary to increase the gain characteristic of the pressure control module 15 in order to improve the capability of the pressure command signal 11a to follow the pressure command value. However, as described above, the increase in the gain characteristic of the pressure control module 15 is limited in terms of the stability of the control system, and the motor speed command value of the motor speed command signal 15b cannot obtain a capability to follow, in a highly responsive manner, the pressure command value of the pressure command signal 11a.

In contrast, according to the configuration of the second embodiment, in the calculation process of the simulated speed calculated value of the simulated motor speed signal 23a in the simulated pressure control module 21, the simulated speed calculated value is set by the restriction processing module 23 to a value equal to or less than the predetermined value. This configuration can bring about a state in which the deviation between the simulated pressure calculated value of the simulated pressure signal 14a and the actual pressure value of the actual pressure signal 6a is approximately 0. As a result, the above-mentioned problem can be prevented from occurring. Along with this effect, the motor speed command value of the motor speed command signal 15b can be maintained to a value equal to or less than the maximum motor speed. In addition, the same effects as in the first embodiment can be simultaneously obtained.

On this occasion, in the conventional device described in Patent Literature 1, the magnitude of the correction value of the correcting speed signal may exceed the maximum speed of the motor, and a motor speed command value equal to or more than the performance (maximum speed) of the motor may be provided as the motor speed command value of the motor speed command signal serving as the reference signal of the motor speed control. In this case, a problem in that an overshoot or a vibration occurs on the actual pressure signal (pressure detected signal) arises, resulting in the adverse effect on the quality of formed/molded products and machined products.

In contrast, according to the second embodiment, in the calculation process of the simulated motor speed signal $23a$ in the simulated pressure control module $21$, the restriction processing module $23$ sets the simulated speed calculated value to be equal to or less than the predetermined value, and hence the overshoot or the vibration generated on the actual pressure signal $6a$ can be suppressed.

Third Embodiment

In the first and second embodiments, the descriptions are given of the configurations in which the simulation calculation system, which is the virtual loop for generating the simulated pressure signal $14a$ from the pressure command signal $11a$, is constituted, and, by using the simulated motor speed signal $12a$ obtained in the calculation process of the simulated pressure calculated value of the simulated pressure signal $14a$, the drive of the motor $2$ is controlled based on the simulated speed calculated value of the simulated motor speed signal $12a$.

In contrast, in the third embodiment, a description is given of a configuration in which, based on the same idea as those of the first and second embodiments, a simulated current calculated value based on which the motor $2$ should operate is calculated by using the simulation calculation system, which is the virtual loop for generating the simulated pressure signal $14a$ from the pressure command signal $11a$, and the drive of the motor $2$ is controlled based on a simulated motor current signal, which is a signal of the simulated current calculated value.

FIG. $5$ is a block diagram illustrating a motor control device according to the third embodiment of the present invention. In FIG. $5$, an overview of a configuration of a motor control device main unit $30$ according to the third embodiment is the same as the configuration of the first embodiment, and the motor control device main unit $30$ according to the third embodiment further includes a simulated speed calculation module $31$ and a simulated current calculation module $32$.

The simulated pressure control module $12$ according to the third embodiment calculates a simulated acceleration calculated value based on the signal $11b$, which is the deviation between the pressure command value of the pressure command signal $11a$ and the simulated pressure calculated value of the simulated pressure signal $14a$, and generates a simulated motor acceleration signal $12b$, which is a signal of the simulated acceleration calculated value. One example of the control by the simulated pressure control module $12$ is proportional control of calculating the simulated acceleration calculated value by multiplying the value of the signal $11b$ by a proportional constant defined by a proportional gain parameter. The control is not limited to this proportional control, and may be the proportional and integral control or the like.

The simulated current calculation module $32$ calculates the simulated current calculated value by multiplying the simulated acceleration calculated value of the simulated motor acceleration signal $12b$ by a constant obtained by dividing a total mechanical inertia, which is a sum of respective inertias of a rotor of the motor $2$, the mechanical load $5$, and the electrically-powered mechanism $4$, by a torque constant which is a ratio of a generated torque to a motor current. Moreover, the simulated current calculation module $32$ generates a simulated motor current signal $32a$, which is a signal of the simulated current calculated value.

The simulated speed calculation module $31$ calculates the simulated speed calculated value by carrying out calculation for the simulated acceleration calculated value of the simulated motor acceleration signal $12b$ by using a transfer characteristic containing a first-order integral characteristic and generates a simulated motor speed signal $31a$, which is a signal of the simulated speed calculated value. On a stage subsequent to the simulated speed calculation module $31$, the simulated position calculation module $13$ according to the third embodiment calculates the simulated position calculated value regarding the motor position by carrying out calculation for the simulated speed calculated value of the simulated motor speed signal $31a$, as in the first embodiment, regarding a transfer characteristic containing a first-order integral characteristic and generates a simulated position signal $13a$, which is a signal of the simulated position calculated value.

The speed control module $16$ according to the third embodiment receives a signal of a motor speed command value, namely a motor speed command signal $15c$, which is a sum of the actual motor speed command value of the actual motor speed command signal $15a$ from the pressure control module $15$ and the simulated speed calculated value of the simulated motor speed signal $31a$. Moreover, the speed control module $16$ calculates the actual current command value so that the actual motor speed of the motor speed signal $3a$ follows the motor speed command value of the motor speed command signal $15c$, and generates an actual motor current signal $16a$, which is a signal of the actual current command value.

The current control module $17$ according to the third embodiment receives a motor current command signal $16b$, which is a signal of a sum of the actual current command value of the actual motor current command signal $16a$ and the simulated current calculated value of the simulated motor current signal $32a$. Moreover, the current control module $17$ carries out control so that a current $17a$ coincides with the current command value of the motor current command signal $16b$. The other configuration is the same as that of the first embodiment.

A description is now given of effects of the third embodiment. An effect of the control of the motor speed based on the sum (motor current command signal $16b$) of the actual current command value of the actual motor current command signal $16a$ and the simulated current calculated value of the simulated motor current signal $32a$ is the same as the effect of the first embodiment. Moreover, the simulated motor current signal $32a$ serves as a current signal for motor $2$ so that the simulated pressure calculated value of the simulated pressure signal $14a$ follows, in a highly responsive manner, the pressure command value of the pressure command signal $11a$. By adding the simulated motor current signal $32a$, in a feed forward manner, to the actual motor current command signal $16a$, which is the output of the speed control module $16$, the motor current command signal $16b$, which is actually provided for the motor $2$, serves as a signal which can realize an improvement of the followability of the pressure.

Moreover, the simulated pressure signal generation module $14$ simulates the characteristic of the pressurized target $7$, and hence the simulated pressure calculated value of the simulated pressure signal 14a and the actual pressure value of the actual pressure signal 6a are approximately equal to each other. As a result, the actual speed command value of the actual motor speed command signal 15a, which is the output of the pressure control module 15, becomes approximately 0. Along with this effect, the simulated speed calculated value of the simulated motor speed signal 31a and the actual motor speed of the actual motor speed signal 3a become approximately equal to each other, and the actual current command value of the actual motor current command signal 16a becomes approximately 0. As a result, the motor 2 is to be driven mainly based on the simulated motor current signal 32a. In general, in the control of the motor 2, the responsiveness to the current is higher than the responsiveness to the speed. Therefore, by adding, in a feed forward manner, the simulated motor current signal 32a serving as the major component of the motor current command signal 16b, an effect that the capability of the pressure command signal 11a to follow the pressure command value is further improved is obtained.

Further, the simulated pressure signal generation module 14 calculates the simulated pressure calculated value of the simulated pressure signal 14a from the simulated position calculated value of the simulated position signal 13a by using a table or an approximation function. With this configuration, the simulated motor current signal 32a serving as the motor current command signal, which can improve the command following characteristic of the actual pressure signal 6a, can be more accurately calculated. It should be noted that when there occurs an error of the simulated pressure calculated value of the simulated pressure signal 14a generated by the simulated pressure signal generation module 14 from the actual pressure value of the actual pressure signal 6a, the actual motor current command signal 16a serves as a signal for correcting the error.

In FIGS. 4, the description is given of the configuration in which, in addition to adding the simulated motor current signal 32a to the actual motor current command signal 16a, the simulated motor speed signal 31a is added to the actual motor speed command signal 15a. However, the configuration is not limited to this example, and the same effect can be obtained with a configuration in which the simulated motor speed signal 31a is not added to the actual motor speed command signal 15a but the simulated motor current signal 32a is added to the actual motor current command signal 16a.

A description is now given of another example of the third embodiment. In this example, a description is given of a configuration in which, in place of the simulated pressure control module 12 of FIG. 5, a simulated pressure control module 41 carrying out the restriction processing as in the second embodiment is used. As illustrated in FIG. 6, the simulated pressure control module 41 includes a transfer characteristic calculation module 42 and a restriction processing module 43.

The transfer characteristic calculation module 42 carries out control calculation such as the proportional control based on a deviation (difference) between the pressure command value of the pressure command signal 11a and the simulated pressure calculated value of the simulated pressure signal 14a. As a result, the transfer characteristic calculation module 42 calculates a simulated acceleration calculated value, and transmits a signal thereof (transfer characteristic output signal) 42a to the restriction processing module 43.

The restriction processing module 43 sets the signal 42a directly to a simulated motor acceleration signal 43a when the simulated acceleration calculated value of the signal 42a from the transfer characteristic calculation module 42 is equal to or less than a predetermined value. On the other hand, the restriction processing module 43 sets the predetermined value as the simulated acceleration calculated value when the simulated acceleration calculated value of the signal 42a from the transfer characteristic calculation module 42 is more than the predetermined value, and sets a signal of the predetermined value as the simulated motor acceleration signal 43a.

On this occasion, the predetermined value of the restriction processing module 43 is preferably equal to less than the maximum acceleration (acceleration which is acquired by multiplying the maximum current of the motor by the torque constant and dividing the product by a total mechanical inertia, which is a sum of the inertias of the motor 2, the electrically-powered mechanism 4, and the mechanical load 5), which is determined by the maximum current of the motor 2, the mechanical inertia (in FIG. 5, corresponding to the inertia of the motor 2, and a total inertia of the electrically-powered mechanism 4, the mechanical load 5, and the pressure detector 6) of portions movable by the motion of the motor, and a torque constant of the motor 2. Moreover, when a linear motor is used to drive the electrically-powered mechanism 4, the maximum acceleration may be the maximum acceleration, which is acquired by multiplying the maximum current of the linear motor by a thrust constant and dividing the product by a mechanical mass obtained by summing mechanical masses of the mover of the linear motor and portions movable by the motion of the motor. The maximum acceleration corresponds to an acceleration obtained by using the maximum motor current.

As a result, the simulated acceleration calculated value of the simulated motor acceleration signal 43a no longer takes a value more than the maximum acceleration of the motor 2, and an effect that the control can be carried out in a state in which the current command value of the motor current command signal 16b does not exceed the maximum current of the motor 2 either is obtained. If a motor current command value exceeding the maximum motor current is provided, the current cannot be controlled, and a vibration occurs in the current. As a result, vibrations are also generated in the pressure and the speed, and an adverse effect is exerted on a machining precision of the pressurized target. Further, in the worst case, the motor may be destroyed by the excessively large current.

In contrast, by setting the restriction value of the restriction processing module to a value equal to less than an acceleration, which is acquired by multiplying the maximum current of the motor by the torque constant and dividing the product by the total mechanical inertia, which is the sum of the inertias of the motor and the mechanical inertias of the movable portions by the motion of the motor, the simulated current signal is restricted to a value equal to or less than the maximum motor current, and hence the simulated pressure signal when the motor operates at a current equal to or less than the maximum motor current is calculated. By adding the simulated current signal in a feed forward manner, the control in which the simulated current calculated value and the current are approximately equal to each other is realized, and, as a result, the control in which the simulated pressure calculated value and the actual pressure value are approximately the same value is provided. As a result, a large deviation is not generated between the actual pressure value and the simulated pressure calculated value, and hence, without increasing the gain characteristic of the pressure control module 15, the capability of the actual pressure value to follow the pressure command value can be improved by using the simulated current calculated value.

Figure 5:
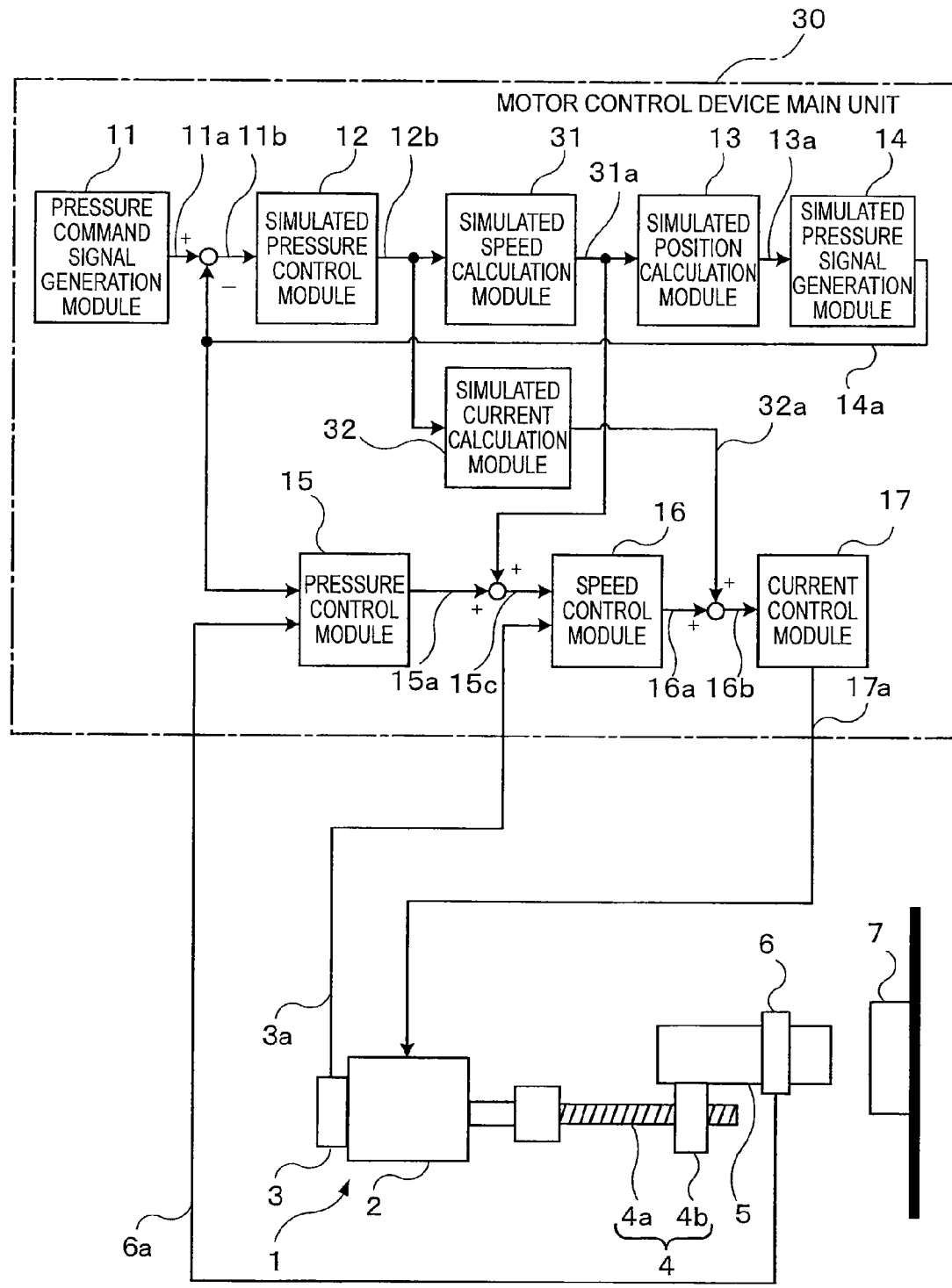
FIG. 5 A block diagram illustrating a motor control device according to a third embodiment of the present invention.
Figure 6:
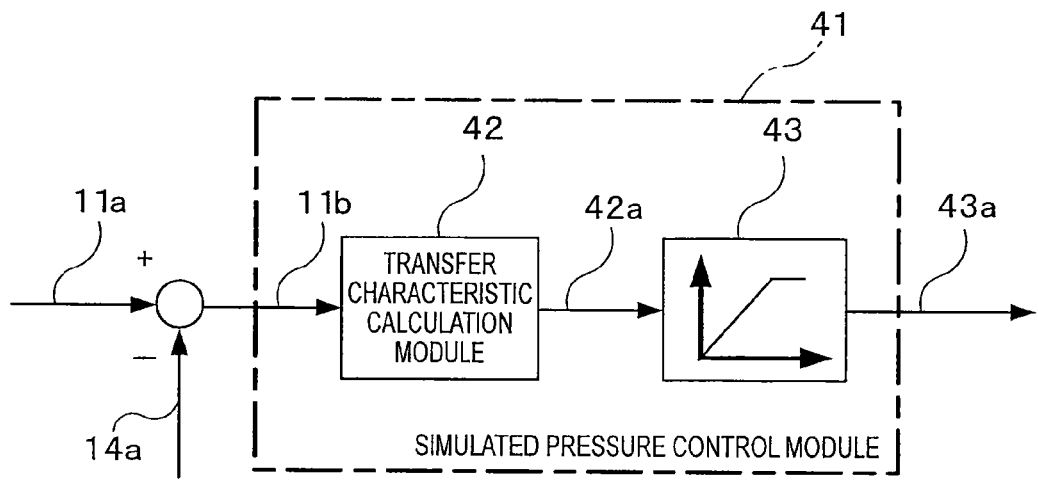
FIG. 6 A block diagram illustrating another example of the motor control device according to the third embodiment of the present invention.
Figure 7:
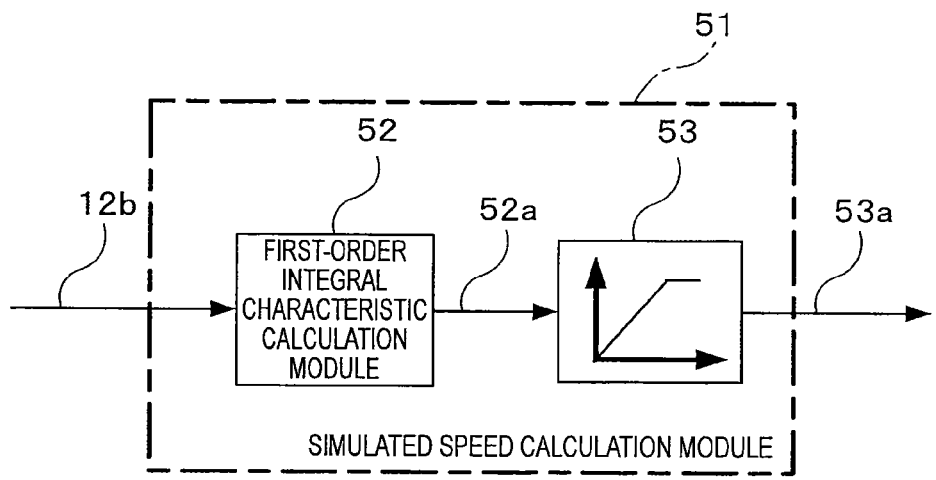
FIG. 7 A block diagram illustrating still another example of the motor control device according to the third embodiment of the present invention.

Now, a description is given of a configuration in which, in place of the simulated speed calculation module 31 of FIG. 5, a simulated speed calculation module 51 for carrying out the restriction processing as in the second embodiment is used. As illustrated in FIG. 7, the simulated speed calculation module 51 includes a first-order integral characteristic calculation module 52 and a restriction processing module 53. The first-order integral characteristic calculation module 52 carries out calculation regarding a transfer characteristic containing a first-order integral characteristic for the simulated acceleration calculated value of the simulated motor acceleration signal 12b, thereby calculating a simulated speed calculated value, and generates a signal 52a thereof.

The restriction processing module 53 sets the signal 52a directly to the simulated motor speed signal 53a when the simulated speed calculated value of the signal 52a from the first-order integral characteristic calculation module 52 is equal to or less than a predetermined value. On the other hand, the restriction processing module 53 sets the predetermined value as the simulated speed calculated value when the simulated speed calculated value of the signal 52a from the first-order integral characteristic calculation module 52 is more than the predetermined value, and sets a signal of the predetermined value as the simulated motor speed signal 53a.

On this occasion, as the predetermined value of the restriction processing module 53, a value equal to or less than the maximum speed of the motor 2 can be taken. As a result, the simulated speed calculated value of the simulated motor speed signal 53a no longer takes a value more than the maximum speed of the motor 2, and, as a result, an effect that the control can be carried out in a state in which the speed command value of the motor speed command signal 15c does not exceed the maximum speed of the motor 2 either is obtained.

By setting the restriction value of the restriction processing module to a value equal to or less than the maximum speed of the motor, the simulated speed signal is restricted to a value equal to or less than the maximum motor speed, and hence the simulated pressure signal when the motor operates at a speed equal to or less than the maximum motor speed is calculated. By adding the simulated speed signal in a feed forward manner, the control in which the simulated speed calculated value and the speed are approximately equal to each other is realized, and, as a result, the control in which the simulated pressure calculated value and the actual pressure value are approximately the same value is provided. As a result, a large deviation is not generated between the actual pressure value and the simulated pressure calculated value, and hence, without increasing the gain characteristic of the pressure control module 15, the capability of the actual pressure value to follow the pressure command value can be improved by using the simulated speed calculated value.

It should be noted that the transfer characteristics of the simulated speed calculation module 31 and the simulated position calculated module 13 according to the third embodiment may only include the first-order integral characteristic, or, as in the first embodiment, may include a low-pass characteristic or the like in addition to the first-order integral characteristic.

Fourth Embodiment

According to the first to third embodiments, the description is given of the configuration in which the pressure control module 15 carries out the control of outputting the signal having the dimension of the speed, namely, the configuration in which the speed control is provided on the minor loop of the pressure control module 15. In contrast, according to a fourth embodiment, a description is given of a configuration in which the pressure control module 15 carries out the control of outputting a signal having the dimension of the current, namely, a configuration in which the current control is provided on the minor loop of the pressure control module 15.

Figure 8:
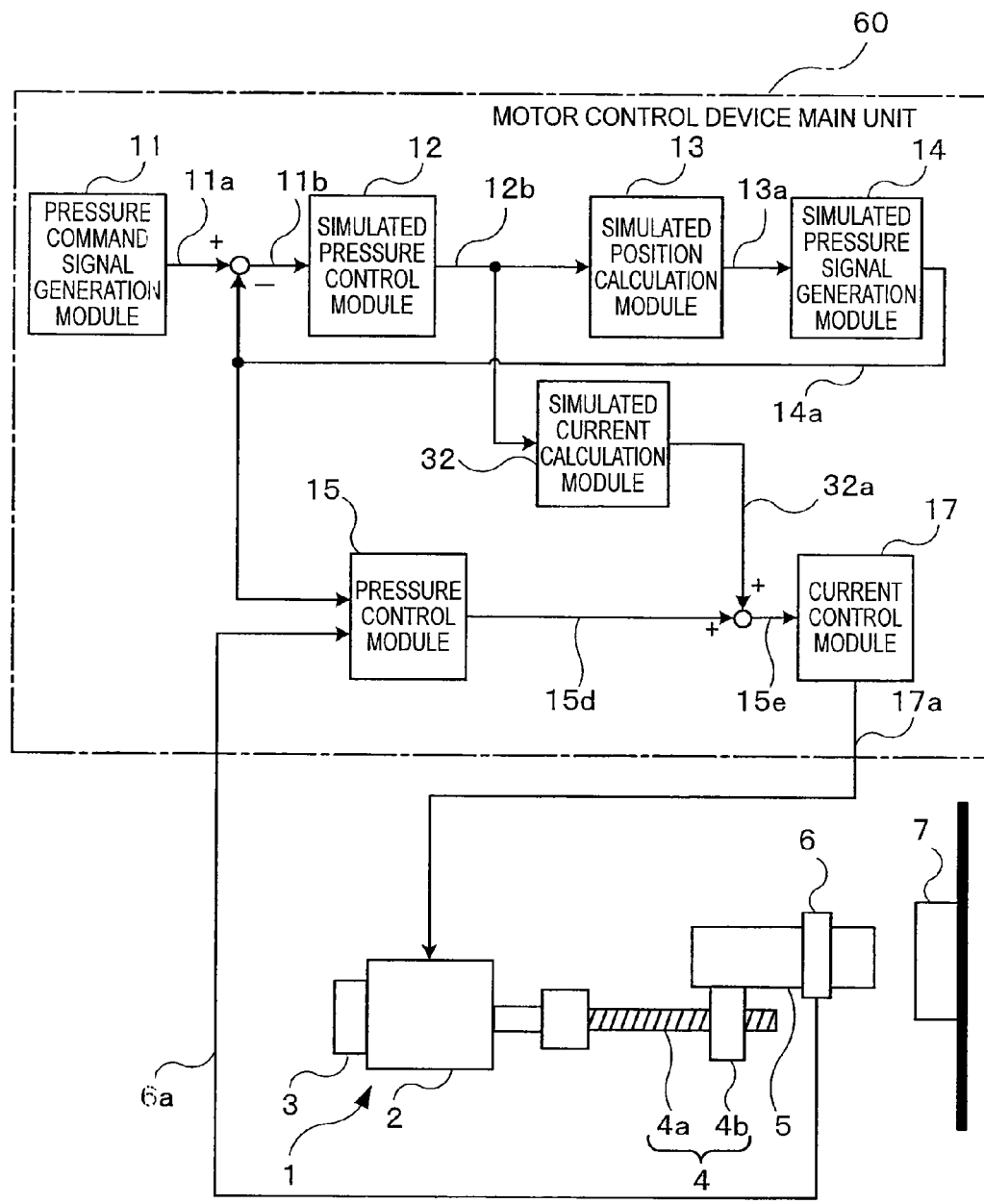
FIG. 8 A block diagram illustrating a motor control device according to a fourth embodiment of the present invention.

FIG. 8 is a block diagram illustrating a motor control device according to the fourth embodiment of the present invention. In FIG. 8, a configuration of a motor control device main unit 60 according to the fourth embodiment is the same as the configuration of the motor control device main unit 10 according to the first embodiment except in that the simulated current calculation module 32 as in the third embodiment is included and that the speed control module 16 is omitted. On this occasion, a description is mainly given of the difference between the first and third embodiments.

The simulated pressure control module 12 according to the fourth embodiment calculates a simulated acceleration calculated value based on the signal 11b, which is a deviation between the respective values of the pressure command signal 11a and the simulated pressure signal 14a, and generates a simulated motor acceleration signal 12b, which is a signal of the simulated acceleration calculated value. One example of the control by the simulated pressure control module 12 is proportional control, proportional and integral control, or the like. The simulated position calculation module 13 according to the fourth embodiment receives the simulated motor acceleration signal 12b from the simulated pressure control module 12, carries out transfer characteristic calculation containing a second-order integral characteristic, calculates a simulated position calculated value, and generates the simulated position signal 13a, which is a signal of the simulated position calculated value.

The simulated current calculation module 32 according to the fourth embodiment calculates the simulated current calculated value by receiving the simulated motor acceleration signal 12b as an input signal, multiplying the simulated acceleration calculated value of the simulated motor acceleration signal 12 by a constant obtained by dividing a total mechanical inertia, which is a sum of the inertias of the rotor of the motor 2, the electrically-powered mechanism 4, and the mechanical load 5, by the torque constant which is the ratio of the generated torque to the motor current, and generates a simulated motor current signal 32a, which is a signal thereof. The current control module 17 according to the fourth embodiment controls the current flowing through the motor 2 based on a current command value of a motor current command signal 15e.

On this occasion, by adding the simulated motor current signal 32a, in a feed forward manner, to an actual motor current command signal 15d, which is an output of the pressure control module 15, the motor current command signal 15e for determining a current actually fed to the motor 2 serves as a signal realizing an improvement of the followability of the pressure. Moreover, the simulated pressure signal generation module 14 accurately simulates the characteristic of the pressurized target 7, and hence the values of the simulated pressure signal 14a and the actual pressure signal 6a are approximately equal to each other.

As a result, the actual current command value of the actual motor current command value 15d, which is the output of the pressure control module 15, becomes approximately 0. As a result, out of the motor current command signal 15e, the simulated motor current signal 32a becomes a major component of the motor current command signal 15e, and serves a signal based on which the motor 2 should operate. When the error of the simulated pressure calculated value of the simulated pressure signal 14a generated by the simulated pressure signal generation module 14 from the actual pressure value is generated, the actual motor current command signal 15*d* serves as a signal for correcting the error.

Moreover, even if the pressurized target 7 exhibits a nonlinear characteristic, the simulated pressure signal generation module 14 calculates the simulated pressure calculated value of the simulated pressure signal 14*a* from the simulated position calculated value of the simulated position signal 13*a* by using a table or an approximation function. With this configuration, an effect that the simulated motor current signal 32*a* serving as the motor current command signal, which can improve the command following characteristic of the actual pressure signal 6*a*, can be generated is obtained.

As described above, according to the fourth embodiment, the configuration in which the current control is provided on the minor loop of the pressure control module 15 can provide the same effects as those of the first and third embodiments.

It should be noted that the same restriction processing as that of the second and third embodiments may be provided in the simulated pressure control module 12 according to the fourth embodiment. Specifically, the simulated pressure control module 12 may be configured as in FIG. 6 according to the third embodiment. An effect brought about by providing the restriction processing is the same as the effect described in the third embodiment.

Fifth Embodiment

In the fourth embodiment, the description has been given of the configuration in which the current control loop is used as the minor loop of the pressure control. In contrast, in a fifth embodiment, a description is given of a configuration in which a position control loop is used as the minor loop of the pressure control.

Figure 9:
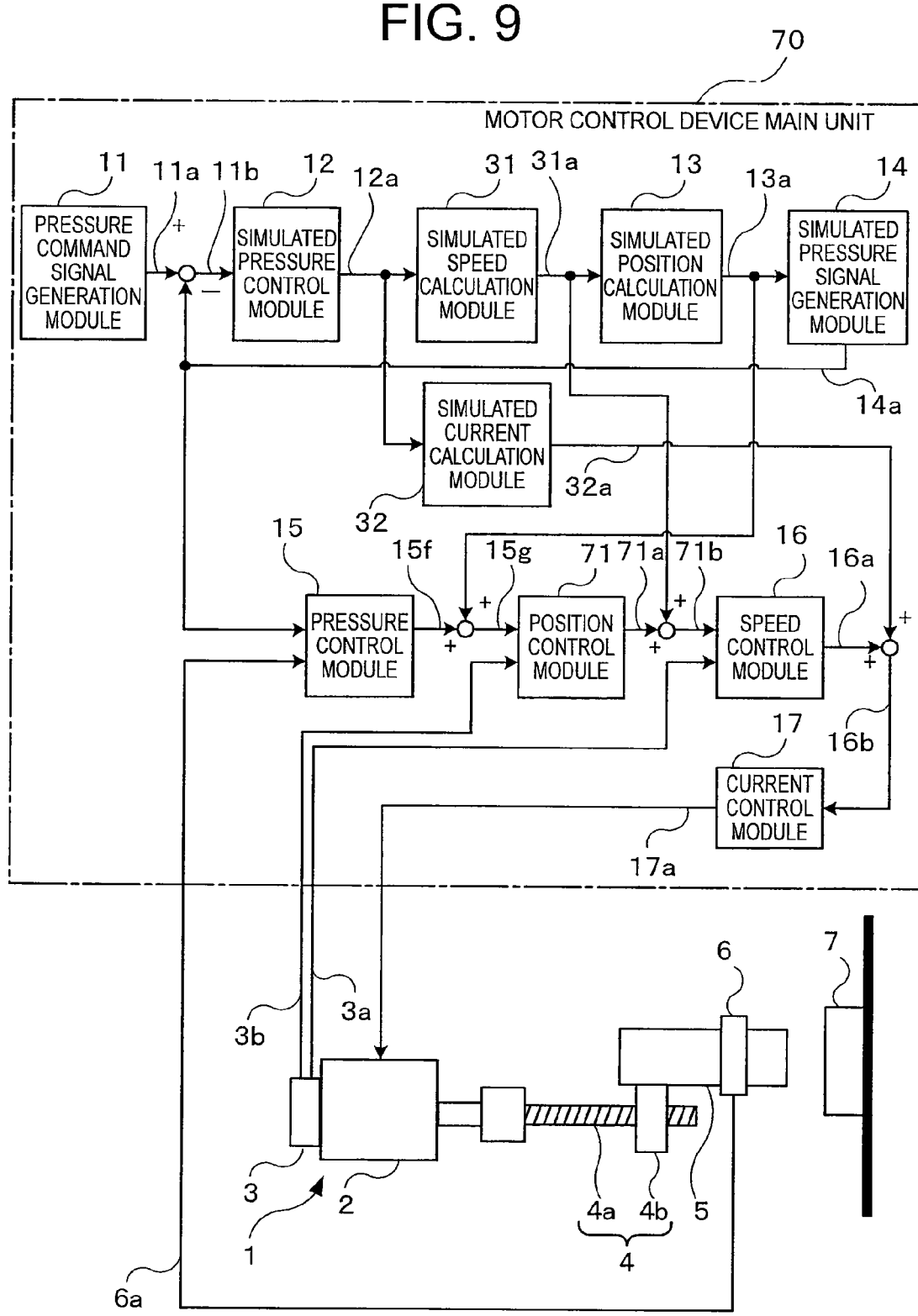
FIG. 9 A block diagram illustrating a motor control device according to a fifth embodiment of the present invention.

FIG. 9 is a block diagram illustrating a motor control device according to the fifth embodiment of the present invention. In FIG. 9, a configuration of a motor control device main unit 70 according to the fifth embodiment is the same as the configuration of the motor control device main unit 30 according to the third embodiment except in that a position control module 71 is further included. On this occasion, a description is mainly given of the difference from the third embodiment.

The encoder 3 according to the fifth embodiment outputs, in addition to the actual motor speed signal 3*a*, an actual motor position signal 3*b*, which is a signal based on the motor position (rotation position). The pressure control module 15 according to the fifth embodiment calculates an actual position command value based on the respective values of the simulated pressure signal 14*a* and the actual pressure signal 6*a*, and generates an actual position command signal 15*f*, which is a signal of the actual position command value. One example of the control by the pressure control module 15 is proportional control of calculating the actual position command value by multiplying a deviation between the values of the simulated pressure signal 14*a* and the actual pressure signal 6*a* by a proportional constant defined by a proportional gain parameter, proportional and integral control, integral control, or the like.

The position control module 71 receives a position command signal 15*g* which is the signal of the sum of the respective values of the actual position command signal 15*d* and the simulated position signal 13*a*. Moreover, the position control module 71 calculates an actual speed command value so that the actual motor position of the actual motor position signal 3*b* follows the position command value of the position command signal 15*g*, and generates an actual motor speed signal 71*a*, which is a signal of the actual speed command value.

One example of the control by the position control module 71 is proportional control of calculating the actual speed command value by multiplying a deviation between the value of the position command signal 15*g* and the value of the actual motor position signal 3*b* by a proportional constant, or the like.

The speed control module 16 receives a motor speed command signal 71*b*, which is a signal of a sum of the respective values of the actual motor speed command signal 71*a* and the simulated motor speed signal 31*a*. Moreover, the speed control module 16 receives the actual motor speed signal 3*a*. Further, the speed control module 16 carries out speed control calculation so that the actual motor speed of the actual motor speed signal 3*a* follows the speed command value of the motor speed command signal 71*b*, calculates an actual current command value, and generates an actual motor current command signal 16*a*, which is a signal of the actual current command value. The current control module 17 controls, based on the current command value of the motor current command signal 16*b*, the current flowing through the motor 2, thereby generating a drive force on the motor 2.

As described above, according to the fifth embodiment, a simulation calculation system (virtual control circuit), which is a virtual loop constituted by the simulated pressure signal generation module 14, the simulated pressure control module 12, the simulated speed calculation module 31, the simulated position calculation module 13, and the simulated current calculation module 32, is constituted on the computer of the motor control device main unit 70. The respective values of the simulated position signal 13*a*, the simulated motor speed signal 31*a*, and the simulated motor current signal 32*a*, which are generated by the simulation calculation system, correspond to a position, a speed, and a current for controlling the actual pressure signal 6*a* to follow the pressure command signal 11*a* in a highly responsive manner. By adding those values in a feed forward manner, the position command signal 15*g*, the motor speed command signal 71*b*, and the motor current command signal 16*d* are generated, and hence, without increasing the gain characteristic of the pressure control module, which causes the oscillation phenomenon during the control, control which can improve the capability to follow the pressure command signal can be realized.

Even if the pressurized target 7 presents a nonlinear characteristic, the simulated pressure signal generation module 14 simulates the characteristic of the pressurized target 7, and hence this effect can be similarly obtained.

It should be noted that, according to the fifth embodiment, all the three types of signals, namely, the simulated position signal 13*a*, the simulated motor speed signal 31*a*, and the simulated motor current signal 32*a*, are used. Accordingly, the position command signal 15*g*, the motor speed command signal 71*b*, and the motor current command signal 16*d* are generated based on the respective signals. However, all the three types of signals do not need to be used, and the drive control of the motor 2 may be carried out by using at least one of the simulated signals. For example, the same effect can be obtained, without adding the simulated motor speed signal 31*a* and the simulated motor current signal 32*a* in a feed forward manner, by generating the position command signal 15*g* by respectively using the actual motor speed command signal 71*a* and the actual motor current command signal 16*a* as the motor speed command signal 71*b* and the motor current command signal 16*b*, adding only the simulated position signal 13*a* to the actual position command signal 15*f*, and by carrying out the drive control of the motor 2 based on the position command signal 15*g*.

Moreover, in at least one of the simulated pressure control module 12 and the simulated speed calculation module 31 according to the fifth embodiment, the restriction processing illustrated in FIGS. 6 and 7 according to the third embodiment may be provided. In this case, in at least one of the simulated pressure control module 12 and the simulated speed calculation module 31, the restriction processing illustrated in FIGS. 6 and 7 according to the third embodiment may be provided. An effect brought about by providing the restriction processing is the same as the effect described in the third embodiment.

Further, the description has been given of the configurations relating to the pressure control in the first to fifth embodiments, but the pressure control according to the first to fifth embodiments may be directly replaced by the force control. Namely, as the mechanical physical quantity, the force can be used.

Moreover, in the first to fifth embodiments, the description is given of the examples of the pressure control in which a motor of rotational type is used, and, by converting the rotational motion to the translational motion, the pressurized target is pressurized by the mechanical load. However, also in a case where a linear motor is used in place of the motor of rotational type, the present invention can be applied. In this case, in the third and fourth embodiments, by replacing the total mechanical inertia by the total mass of the motor 2, the electrically-powered mechanism 4, and the mechanical load 5, and by replacing the maximum motor torque constant by the thrust constant, the same processing as in the third and fourth embodiments can be applied.

Further, in the first to fifth embodiments, the pressure detector 6 is used, but it is not always necessary to provide the pressure detector 6 physically. In this case, the pressure may be acquired by estimation from information on the current and the speed of the motor, and the pressure may be controlled based on the estimated value (physical quantity acquired value).

The invention claimed is:

1. A motor control device provided to an electrically-powered mechanism which includes a motor, is connected to a mechanical load for applying a mechanical physical quantity, which is any one of a force and a pressure, to a target, and applies the mechanical physical quantity to the target, by power of the motor, by displacing the mechanical load to press the mechanical load against the target, the motor control device comprising a motor control device main unit for acquiring, as a physical quantity acquired value, a value of the mechanical physical quantity acting from the mechanical load to the target, generating a physical quantity command value used to control the physical quantity acquired value to attain a physical quantity target value set in advance, and controlling drive of the motor by using the generated physical quantity command value, wherein:

the motor control device main unit comprises:

a simulated physical quantity control module for calculating a simulated speed calculated value regarding a motor speed by carrying out a predetermined simulated physical quantity control calculation from a difference between the physical quantity command value and a simulated physical quantity calculated value;

a simulated position calculation module for calculating a simulated position calculated value regarding any one of a motor position and a position of the mechanical load by carrying out calculation on the simulated speed calculated value by using a transfer characteristic including a first-order integral characteristic;

a simulated physical quantity calculation module for calculating the simulated physical quantity calculated value, which is a value simulating the mechanical physical quantity acting from the mechanical load to the target, by storing, in advance, information on the mechanical physical quantity and information on any one of the motor position and the position of the mechanical load in association with each other as information for simulation calculation, and by carrying out calculation on the simulated position calculated value by using the information for simulation calculation; and a physical quantity control module for calculating an actual speed command value regarding the motor speed by carrying out pressure control calculation based on the physical quantity acquired value and the simulated physical quantity calculated value; and the motor control device main unit controls the motor speed based on a sum of the simulated speed calculated value and the actual speed command value.

2. A motor control device according to claim 1, wherein the simulated physical quantity control module comprises:

a transfer characteristic calculation module for calculating, based on the difference between the physical quantity command value and the simulated physical quantity calculated value, a predetermined transfer characteristic for calculating the simulated speed calculated value; and a restriction processing module for setting, when a calculated result by the transfer characteristic calculation module is equal to or less than a predetermined value, the calculated result as the simulated speed calculated value, and setting, when the calculated result by the transfer characteristic calculation module is more than the predetermined value, the predetermined value to the simulated speed calculated value.

3. A motor control device according to claim 2, wherein the predetermined value of the restriction processing module is equal to or less than a maximum motor speed.

4. A motor control device provided to an electrically-powered mechanism which includes a motor, is connected to a mechanical load for applying a mechanical physical quantity, which is any one of a force and a pressure, to a target, and applies the mechanical physical quantity to the target, by power of the motor, by displacing the mechanical load to press the mechanical load against the target, the motor control device comprising a motor control device main unit for acquiring, as a physical quantity acquired value, a value of the mechanical physical quantity acting from the mechanical load to the target, generating a physical quantity command value used to control the physical quantity acquired value to attain a physical quantity target value set in advance, and controlling drive of the motor by using the generated physical quantity command value, wherein:

the motor control device main unit comprises:

a simulated physical quantity control module for calculating a simulated acceleration calculated value regarding a motor acceleration by carrying out a predetermined simulated physical quantity control calculation from a difference between the physical quantity command value and a simulated physical quantity calculated value;

a simulated current calculation module for calculating a simulated current calculated value regarding a motor current by carrying out calculation on the simulated acceleration calculated value by using a transfer characteristic including a proportional characteristic;

a simulated speed calculation module for calculating a simulated speed calculated value regarding a motor speed by carrying out calculation on the simulated acceleration calculated value by using a transfer characteristic including a first-order integral characteristic;

a simulated position calculation module for calculating a simulated position calculated value for any one of a motor position and a position of the mechanical load by carrying out calculation on the simulated speed calculated value by using the transfer characteristic including the first-order integral characteristic;

a simulated physical quantity calculation module for calculating the simulated physical quantity calculated value, which is a value simulating the mechanical physical quantity acting from the mechanical load to the target, by storing, in advance, information on the mechanical physical quantity and information on any one of the motor position and the position of the mechanical load in association with each other as information for simulation calculation, and by carrying out calculation on the simulated position calculated value by using the information for simulation calculation; and a physical quantity control module for calculating an actual speed command value regarding the motor speed by carrying out pressure control calculation based on the physical quantity acquired value and the simulated physical quantity calculated value; and the motor control device main unit calculates an actual current command value regarding the motor current by carrying out speed control calculation by using the actual speed command value, and controls the motor current based on a sum of the actual current command value and the simulated current calculated value.

5. A motor control device according to claim 4, wherein the simulated speed calculation module comprises:

a transfer characteristic calculation module for calculating, based on the simulated acceleration calculated value, a predetermined transfer characteristic for calculating the simulated speed calculated value; and a restriction processing module for setting, when a calculated result by the transfer characteristic calculation module is equal to or less than a predetermined value, the calculated result as the simulated speed calculated value, and setting, when the calculated result by the transfer characteristic calculation module is more than the predetermined value, the predetermined value to the simulated speed calculated value.

6. A motor control device according to claim 5, wherein the predetermined value of the restriction processing module is equal to or less than a maximum motor speed.

7. A motor control device according to claim 4, wherein the simulated physical quantity control module comprises:

a transfer characteristic calculation module for calculating, based on the difference between the physical quantity command value and the simulated physical quantity calculated value, a predetermined transfer characteristic for calculating the simulated acceleration calculated value; and a restriction processing module for setting, when a calculated result by the transfer characteristic calculation module is equal to or less than a predetermined value, the calculated result as the simulated acceleration calculated value, and setting, when the calculated result by the transfer characteristic calculation module is more than the predetermined value, the predetermined value to the simulated acceleration calculated value.

8. A motor control device according to claim 7, wherein the predetermined value of the restriction processing module is equal to or less than a value acquired by multiplying a maximum current of the motor by a torque constant or a thrust constant, and by dividing a product of the multiplication by a mechanical inertia of a portion moved by a motion of the motor or a total mechanical mass.

9. A motor control device provided to an electrically-powered mechanism which includes a motor, is connected to a mechanical load for applying a mechanical physical quantity, which is any one of a force and a pressure, to a target, and applies the mechanical physical quantity to the target, by power of the motor, by displacing the mechanical load to press the mechanical load against the target, the motor control device comprising a motor control device main unit for acquiring, as a physical quantity acquired value, a value of the mechanical physical quantity acting from the mechanical load to the target, generating a physical quantity command value used to control the physical quantity acquired value to attain a physical quantity target value set in advance, and controlling drive of the motor by using the generated physical quantity command value, wherein:

the motor control device main unit comprises:

a simulated physical quantity control module for calculating a simulated position calculated value regarding a motor position by using a difference between the physical quantity command value and a simulated physical quantity calculated value;

a simulated physical quantity calculation module for calculating the simulated physical quantity calculated value, which is a value simulating the mechanical physical quantity acting from the mechanical load to the target, by storing, in advance, information on the mechanical physical quantity and information on any one of the motor position and a position of the mechanical load in association with each other as information for simulation calculation, and by carrying out calculation on the simulated position calculated value by using the information for simulation calculation; and a physical quantity control module for calculating an actual position command value regarding the motor position by carrying out pressure control calculation based on the physical quantity acquired value and the simulated physical quantity calculated value; and the motor control device main unit controls the motor position based on a sum of the simulated position calculated value and the actual position command value.

* * * * *